(12) United States Patent
Zhang et al.

(10) Patent No.: US 10,502,994 B2
(45) Date of Patent: Dec. 10, 2019

(54) COLOR FILTER ON ARRAY SUBSTRATE AND FABRICATING METHOD THEREOF AS WELL AS A DISPLAY DEVICE

(71) Applicant: BOE TECHNOLOGY GROUP CO., LTD., Beijing (CN)

(72) Inventors: Feng Zhang, Beijing (CN); Zhanfeng Cao, Beijing (CN); Qi Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 55 days.

(21) Appl. No.: 14/778,059

(22) PCT Filed: Apr. 14, 2015

(86) PCT No.: PCT/CN2015/076521
§ 371 (c)(1),
(2) Date: Sep. 17, 2015

(87) PCT Pub. No.: WO2016/065852
PCT Pub. Date: May 6, 2016

(65) Prior Publication Data
US 2016/0306220 A1    Oct. 20, 2016

(30) Foreign Application Priority Data
Oct. 31, 2014    (CN) .......................... 2014 1 0602819

(51) Int. Cl.
*G02F 1/1333*    (2006.01)
*G02F 1/1335*    (2006.01)
(Continued)

(52) U.S. Cl.
CPC .... *G02F 1/133345* (2013.01); *G02F 1/13439* (2013.01); *G02F 1/133512* (2013.01);
(Continued)

(58) Field of Classification Search
None
See application file for complete search history.

(56) References Cited

U.S. PATENT DOCUMENTS 6,330,047 B1 * 12/2001 Kubo ................ G02F 1/133555
349/110
6,372,534 B1 * 4/2002 den Boer .......... G02F 1/136213
257/E21.414
(Continued)

FOREIGN PATENT DOCUMENTS

CN    101153974 A    4/2008
CN    101634789 A    1/2010
(Continued)

OTHER PUBLICATIONS

Decision on Rejection in Chinese Application No. 201410602819.5 dated Dec. 1, 2016, with English translation. 11 pages.
(Continued)

*Primary Examiner* — Ryan Crockett
(74) *Attorney, Agent, or Firm* — Womble Bond Dickinson (US) LLP

(57) ABSTRACT

The present invention provides a COA substrate and a fabricating method thereof as well as a display device, and relates to the field of display technology, which solves the problem of a relatively large parasitic capacitance to be generated between the data line and the common electrode layer because the common electrode layer is formed on the black matrix directly in the existing technical solution, avoids signal delay, and improves the image display quality of the display. The COA substrate comprises: a black matrix, a color filter, a common electrode layer and an organic insulating film layer formed on the black matrix, the common electrode layer is formed on the organic insulating film layer, the organic insulating film layer is arranged on the color filter and covers the position of the color filter; the
(Continued)

material of the organic insulating film layer is an organic insulating material having a relative dielectric constant less than 10. The present invention is applied in the fabricating technology of a display device.

14 Claims, 3 Drawing Sheets

(51) Int. Cl.
*G02F 1/1343* (2006.01)
*G02F 1/1362* (2006.01)
*G02F 1/136* (2006.01)

(52) U.S. Cl.
CPC .. *G02F 1/133514* (2013.01); *G02F 1/136209* (2013.01); *G02F 1/136286* (2013.01); *G02F 1/134309* (2013.01); *G02F 2001/13606* (2013.01); *G02F 2001/134372* (2013.01); *G02F 2001/136222* (2013.01); *G02F 2201/121* (2013.01); *G02F 2201/123* (2013.01); *G02F 2202/42* (2013.01)

(56) References Cited

U.S. PATENT DOCUMENTS

| | | | |
|---|---|---|---|
| 2002/0126243 A1 | 9/2002 | Hibino et al. | |
| 2005/0140875 A1 | 6/2005 | Jeoung et al. | |
| 2008/0068537 A1* | 3/2008 | Lee | G02F 1/136209 349/106 |
| 2008/0081464 A1* | 4/2008 | Matsuda | H01L 21/02063 438/660 |
| 2008/0113461 A1* | 5/2008 | Tung | G02F 1/136209 438/30 |
| 2008/0129669 A1* | 6/2008 | Kim | G02F 1/136227 345/88 |
| 2010/0045883 A1* | 2/2010 | Kim | G02F 1/13439 349/37 |
| 2011/0001909 A1* | 1/2011 | Tseng | G02F 1/136209 349/106 |
| 2012/0075545 A1* | 3/2012 | Sato | G02F 1/136286 349/42 |
| 2013/0201429 A1* | 8/2013 | Xu | G02F 1/133512 349/95 |
| 2014/0009703 A1* | 1/2014 | Park | G02F 1/1313 349/15 |
| 2014/0055690 A1* | 2/2014 | Song | G02F 1/13338 349/12 |
| 2014/0104527 A1 | 4/2014 | Yang et al. | |
| 2016/0103353 A1* | 4/2016 | Kim | G02F 1/13394 349/42 |
| 2016/0209717 A1* | 7/2016 | Lee | G02B 5/201 |
| 2017/0139299 A1* | 5/2017 | Nakao | G02F 1/13394 |
| 2017/0153519 A1* | 6/2017 | Xu | G02F 1/1368 |
| 2017/0315392 A1* | 11/2017 | Noh | G02F 1/1368 |

FOREIGN PATENT DOCUMENTS

| | | |
|---|---|---|
| CN | 102004342 | 4/2011 |
| CN | 102116980 A | 7/2011 |
| CN | 102116981 A | 7/2011 |
| CN | 102645808 | 8/2012 |
| CN | 102681276 A | 9/2012 |
| CN | 103336396 A | 10/2013 |
| CN | 103529589 | 1/2014 |
| CN | 103529589 A | 1/2014 |
| CN | 103676281 | 3/2014 |
| CN | 104298040 | 1/2015 |
| CN | 204116761 U | 1/2015 |
| KR | 20110064272 | 6/2011 |

OTHER PUBLICATIONS

International Search Report and Written Opinion with English Language Translation, dated Jul. 17, 2015, Application No. PCT/CN2015/076521.
Office Action in Chinese Application No. 201410602819.5 dated Aug. 1, 2016, with English translation. 13 pages.
Notice of Reexamination in Chinese Application No. 201410602819.5 dated Aug. 11, 2017, with English translation.
"Extended European Search Report," EP Application No. 15795096.5 (dated Apr. 24, 2018).

* cited by examiner

COLOR FILTER ON ARRAY SUBSTRATE AND FABRICATING METHOD THEREOF AS WELL AS A DISPLAY DEVICE

FIELD OF THE INVENTION

The present disclosure relates to the field of display technology, particularly to a color filter on array substrate and fabricating method thereof as well as a display device.

BACKGROUND OF THE INVENTION

Display devices such as liquid crystal displays (LCD) and organic electroluminescent devices (OLED) have become necessities in people's life. With the increase of people's requirements, in order to improve display quality of the display device and avoid the deviation in box aligning of the array substrate and the color film substrate from influencing the aperture opening ratio of the display device and the problem of light leakage, the integration technology of integrating the color filter and the array substrate together, i.e., color filter on array (Color Filter on Array, COA) emerges as the times require. The COA technology is namely arranging the black matrix and the color filter on the array substrate.

As shown in FIG. 1, in the existing COA substrate, the color filter 9 is not arranged at the position above the black matrix 8, the common electrode layer 11 is arranged on the black matrix 8 directly, since the film thickness of the color filter 9 is relatively large, the "section difference phenomenon" will be produced, such that the total film thickness between the common electrode layer 11 and the data line 14 will be relatively small, consequently, a relatively large parasitic capacitance will be generated between the data line and the common electrode layer, a relatively large signal delay will be generated, and the image display quality of the display will be reduced.

SUMMARY OF THE DISCLOSURE

The embodiment of the present disclosure provides a COA substrate and fabricating method thereof as well as a display device, which solves the problem of a relatively large parasitic capacitance to be generated between the data line and the common electrode layer because the common electrode layer is formed on the black matrix directly in the existing technical solution, avoids signal delay, and improves the image display quality of the display.

In order to achieve the above purpose, one embodiment of the present disclosure adopts the following technical solutions:

At a first aspect, there is provided a COA substrate, the COA substrate comprising: a black matrix, a color filter, a common electrode layer and an organic insulating film layer formed on the black matrix, the common electrode layer is formed on the organic insulating film layer, wherein:

the organic insulating film layer is arranged on the color filter, and covers a position of the color filter;

a material of the organic insulating film layer is an organic insulating material having a relative dielectric constant less than 10.

Optionally, the COA substrate further comprises: a second passivation layer and a pixel electrode layer, wherein:

the second passivation layer is arranged on the common electrode layer, and covers a position of the common electrode layer;

the pixel electrode layer is arranged on the second passivation layer;

a material of the second passivation layer is an organic material having a relative dielectric constant less than 5.

Optionally, the material of the organic insulating film layer is an organic insulating material having a relative dielectric constant less than 5.

Optionally, the thickness of the organic insulating film layer is greater than or equal to 1 μm.

Optionally, the thickness of the second passivation layer is greater than or equal to 1 μm.

At a second aspect, there is provided a method of fabricating a COA substrate, wherein the method comprises:

forming a black matrix on the substrate;

forming a color filter covering the substrate on the black matrix;

forming an organic insulating film layer covering the color filter on the color filter using an organic insulating material having a relative dielectric constant less than 10;

forming a common electrode layer on the organic insulating film layer.

Optionally, the method further comprises:

forming a second passivation layer covering the common electrode layer on the common electrode layer using an organic material having a relative dielectric constant less than 5;

forming a pixel electrode layer on the second passivation layer.

Optionally, the step of forming an organic insulating film layer covering the color filter on the color filter using an organic insulating material having a relative dielectric constant less than 10 comprises:

forming an organic insulating layer film having a thickness greater than or equal to 1 μm on the color filter using an organic insulating material having a relative dielectric constant less than 5;

forming the organic insulating film layer covering the color filter by processing the organic insulating layer film through patterning process.

Optionally, the step of forming a second passivation layer covering the common electrode layer on the common electrode layer using an organic material having a relative dielectric constant less than 5 comprises:

forming the second passivation layer having a thickness greater than or equal to 1 μm and covering the common electrode layer on the common electrode layer using an organic material having a relative dielectric constant less than 5.

At a third aspect, there is provided a display device, the display device comprising a COA substrate stated in any of the first aspect.

The COA substrate and the fabricating method thereof as well as the display device provided by the embodiment of the present disclosure, by using an organic insulating material having a relative dielectric constant less than 10, form an organic insulating film layer on the color filter, so that the total film thickness between the data line and the common electrode layer is increased, meanwhile, the relative dielectric constant of the material of the organic insulating film layer is reduced, thus the parasitic capacitance between the data line and the common electrode layer in the finally formed COA substrate is much less than the parasitic capacitance between the data line and the common electrode in the COA substrate in the existing technical solution, which solves the problem of a relatively large parasitic capacitance to be generated between the data line and the common electrode layer because the common electrode layer is formed on the black matrix directly in the existing technical solution, avoids signal delay, and improves the image display quality of the display.

BRIEF DESCRIPTION OF THE DRAWINGS

In order to explain the embodiments of the present disclosure or the technical solutions in the prior art more clearly, the drawings to be used in the embodiments or the description of the prior art will be introduced briefly next. Apparently, the drawings described below are only some embodiments of the present disclosure, for the ordinary skilled person in the art, other drawings can also be obtained from these drawings on the premise of not paying any creative work.

Reference signs: 1—substrate; 2—gate; 3—gate insulating layer; 4—active layer; 5—source; 6—drain; 7—first passivation layer; 8—black matrix; 9—color filter; 10—organic insulating film layer; 11—common electrode layer; 12—second passivation layer; 13—pixel electrode layer; 14—data line.

DETAILED DESCRIPTION OF THE INVENTION

Next, the technical solutions in the embodiments of the present disclosure will be described clearly and completely with reference to the drawings in the embodiments of the present disclosure. Apparently, the embodiments described are only a part rather than all of the embodiments of the present disclosure. Based on the embodiments in the present disclosure, all other embodiments obtained by the ordinary skilled person in the art on the premise of not paying any creative work belong to the protection scope of the present disclosure.

Figure 1:
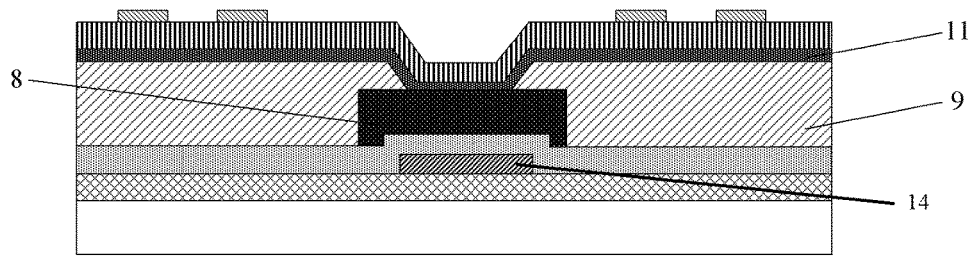
FIG. 1 is a schematic view of structure of a COA substrate provided in the existing technical solution.
Figure 2:
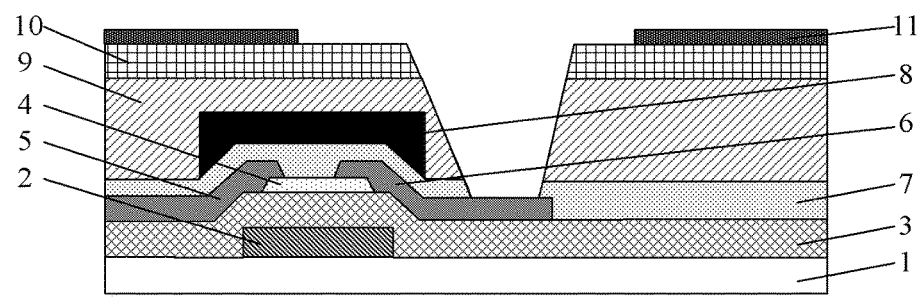
FIG. 2 is a schematic view of structure of a COA substrate provided by an embodiment of the present disclosure.
Figure 3:
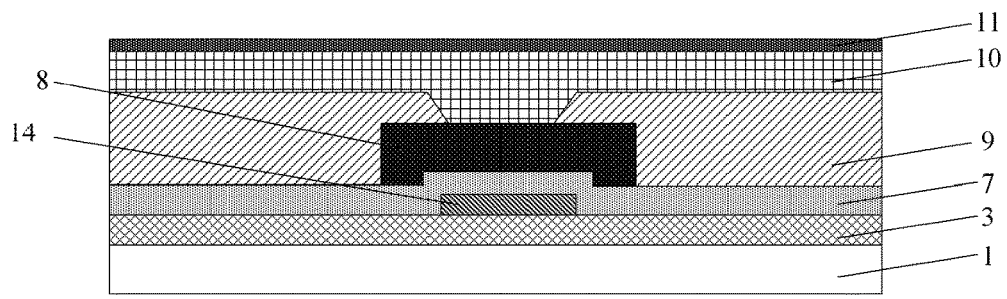
FIG. 3 is a schematic view of structure of another COA substrate provided by another embodiment of the present disclosure.

The embodiment of the present disclosure provides a COA substrate, as shown in FIG. 2 and FIG. 3, the COA substrate comprises: a substrate 1, a gate 2, a gate insulating layer 3, an active layer, a source 5, a drain 6, a data line 14, a first passivation layer 7, a black matrix 8, a color filter 9, an organic insulating film layer 10 formed on the black matrix 8 and a common electrode layer 11 formed on the organic insulating film layer 10, wherein:

the organic insulating film layer 10 is arranged on the color filter and covers the position of the color filter.

The material of the organic insulating film layer 10 is an organic insulating material having a relative dielectric constant less than 10.

Specifically, this embodiment arranges an organic insulating film layer on the color filter, thus the total thickness between the data line and the common electrode layer will be greater than the thickness between the data line and the common electrode layer n the prior art. Meanwhile, the organic insulating film layer in this embodiment is formed using an organic insulating material having a relatively low relative dielectric constant, which will not increase the relative dielectric constant between the data line and the common electrode layer, thereby being capable of reducing the parasitic capacitance between the data line and the common electrode layer effectively. Furthermore, since the organic insulating film layer is arranged on the color filter, flattening processing can be performed to the color filter, the problem of arrangement disorder of the liquid crystal molecules caused by section difference in the color filter and the common electrode layer will not occur, the contrast of the display device is increased further.

Wherein, the substrate can be a glass substrate or a quartz substrate etc.; the gate, the source and the drain can be formed by using metal materials etc.; the gate insulating layer can be formed by using silicon nitrogen or using silicon oxide and silicon oxynitride; the active layer can be formed by using metal oxide semiconductor materials etc.; the first passivation layer can be formed by using silicon nitrogen or transparent organic resin materials etc.; the common electrode layer can be formed by using indium tin oxide (ITO) or indium-doped zinc oxide (IZO) etc.

The COA substrate provided by an embodiment of the present disclosure, by using an organic insulating material having a relative dielectric constant less than 10, forms an organic insulating film layer on the color filter of the COA substrate, so that the total film thickness between the data line and the common electrode layer is increased, meanwhile, the relative dielectric constant of the material of the organic insulating film layer is reduced, thus the parasitic capacitance between the data line and the common electrode layer in the finally formed COA substrate is much less than the parasitic capacitance between the data line and the common electrode in the COA substrate in the existing technical solution, which solves the problem of a relatively large parasitic capacitance to be generated between the data line and the common electrode layer because the common electrode layer is formed on the black matrix directly in the existing technical solution, avoids signal delay, and improves the image display quality of the display.

Figure 4:
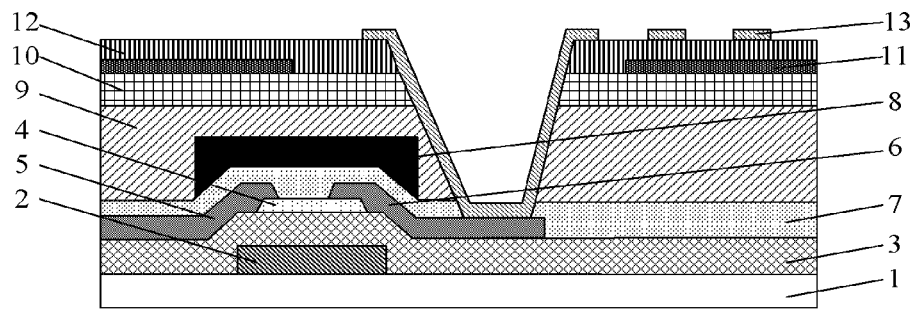
FIG. 4 is a schematic view of structure of a further COA substrate provided by a further embodiment of the present disclosure.
Figure 5:
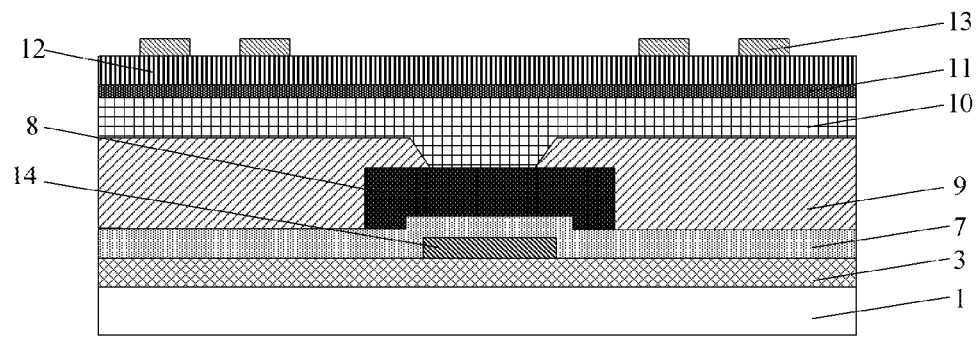
FIG. 5 is a schematic view of structure of yet another COA substrate provided by yet another embodiment of the present disclosure.
Figure 6:
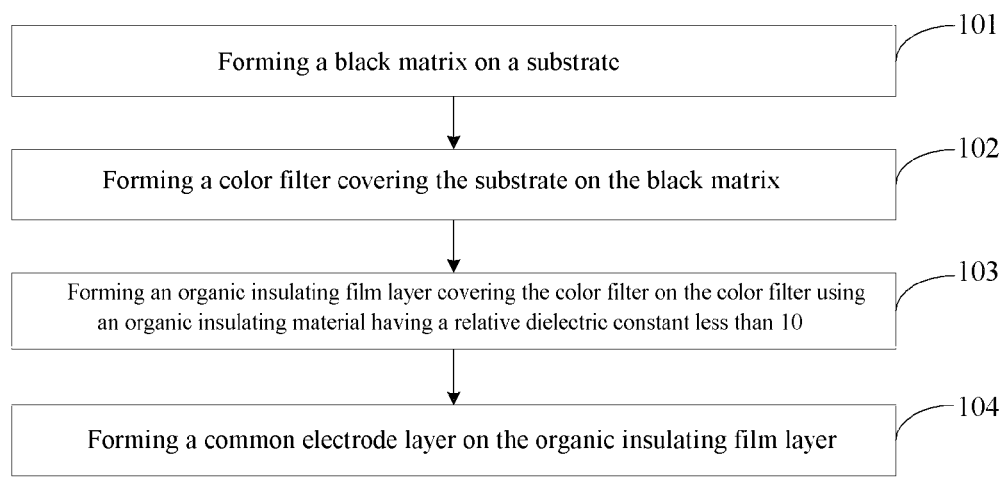
FIG. 6 is a schematic view of flow chart of a method of fabricating a COA substrate provided by an embodiment of the present disclosure.
Figure 7:
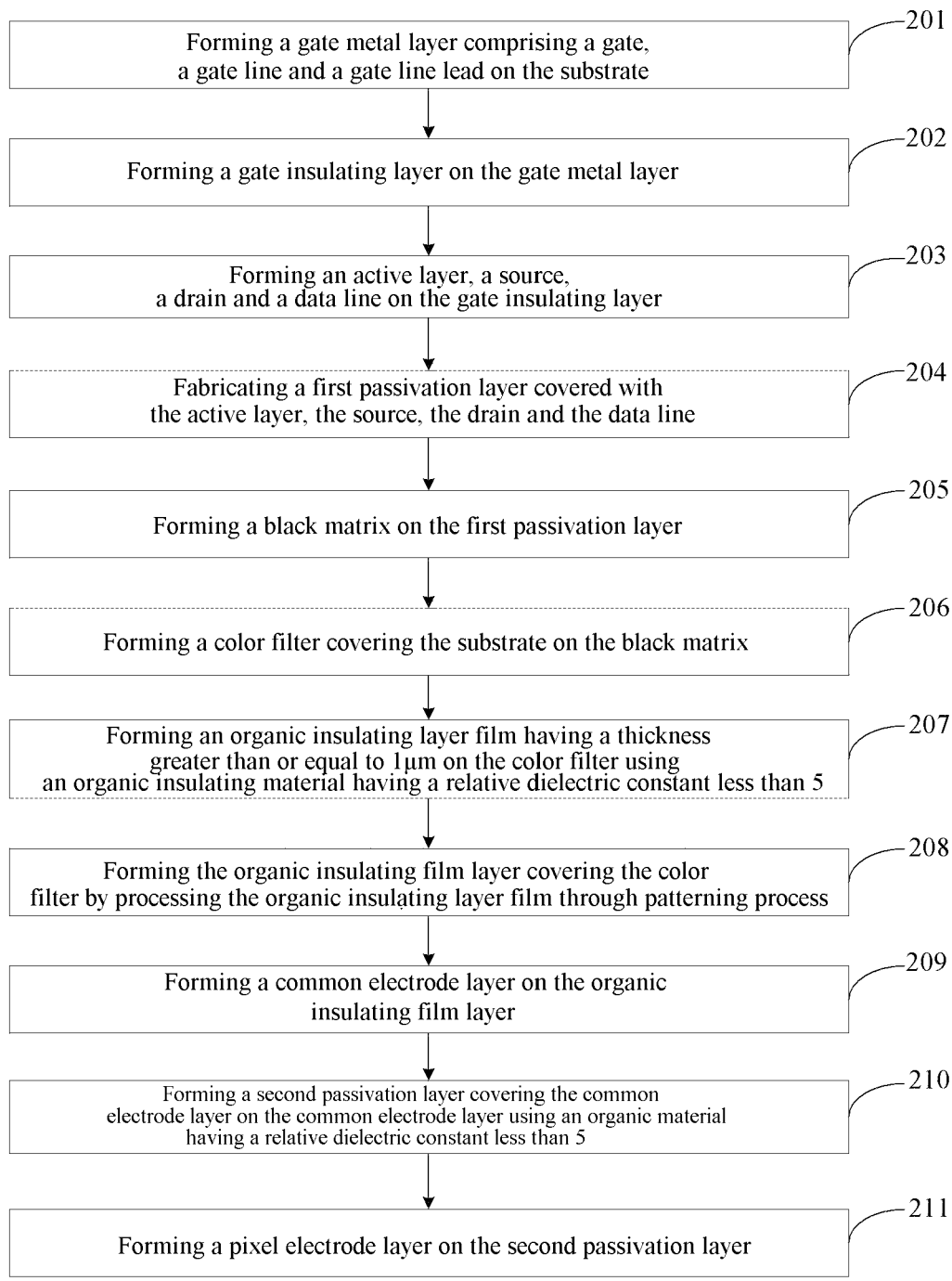
FIG. 7 is a schematic view of flow chart of another method of fabricating a COA substrate provided by another embodiment of the present disclosure.

Further, as shown in FIG. 4 and FIG. 5, the COA substrate further comprises: a second passivation layer 12 and a pixel electrode layer 13, wherein:

the second passivation layer 12 is arranged on the common electrode layer 11, and covers the position of the common electrode layer 11.

The pixel electrode layer 13 is arranged on the second passivation layer 12.

The material of the second passivation layer 12 is an organic material having a relatively dielectric constant less than 5.

Specifically, when the pixel size of the display is relatively large and generally the width of the sub-pixel in the display is greater than 100p m, the passivation layer in this embodiment is formed by using an organic material having a relatively small relative dielectric constant, for example, it may be acrylic resin or polyamide resin etc. In this way, even if the pixel size is relatively large, the opposite area between the pixel electrode and the common electrode is relatively large, however, since the relative dielectric constant of the passivation layer in this embodiment is less than the relative dielectric constant of the passivation layer in the existing technical solution, the problem that the storage capacitance between the common electrode and the pixel electrode is too large is avoided, such that the storage capacitance between the common electrode and the pixel electrode can still remain within an appropriate range, and will not influence the performance of the COA substrate formed. It should be explained that when the pixel size of the display is relatively small and generally the width of the sub-pixel in the display is less than 30p m, a material having a relatively large relative dielectric constant can be used, e.g., inorganic materials such as silicon nitrogen, silicon oxynitride having a relative dielectric constant greater than 5, meanwhile, the thickness of the passivation layer is set between 2000~6000 Å, so as to avoid the problem that the storage capacitance between the common electrode and the pixel electrode is too small.

Wherein, preferably, the material of the organic insulating film layer is an organic insulating material having a relative dielectric constant less than 5.

Specifically, the material of the organic insulating film layer may be acrylic resin or polyamide resin etc.

The thickness of the organic insulating film layer is greater than or equal to 1 μm.

Specifically, the thickness of the organic insulating film layer is set to be greater than or equal to 1 μm, this thickness can ensure that the formed organic insulating film layer also has a flattening effect, or the flattening processing can also be performed to the organic insulating film layer and the upper layer of the color filter, to form a common electrode layer again, so as to ensure that the finally formed COA substrate would not have the problem of arrangement disorder of the liquid crystal molecules caused by "section difference" in the color filter and the common electrode layer, and achieve the display effect of the liquid crystal display better.

The thickness of the second passivation layer is greater than or equal to 1 μm.

Specifically, the thickness of the passivation layer is set to be greater than or equal to 1 μm, which can further avoid the problem that the storage capacitance between the common electrode and the pixel electrode is too large when the pixel size is too large.

The COA substrate provided by an embodiment of the present disclosure, by using an organic insulating material having a relative dielectric constant less than 10, forms an organic insulating film layer on the color filter of the COA substrate, so that the total film thickness between the data line and the common electrode layer is increased, meanwhile, the relative dielectric constant of the material of the organic insulating film layer is reduced, thus the parasitic capacitance between the data line and the common electrode layer in the finally formed COA substrate is much less than the parasitic capacitance between the data line and the common electrode in the COA substrate in the existing technical solution, which solves the problem of a relatively large parasitic capacitance to be generated between the data line and the common electrode layer because the common electrode layer is formed on the black matrix directly in the existing technical solution, avoids signal delay, and improves the image display quality of the display. Furthermore, the performance of the COA substrate can be improved, and the display effect of the display screen can be improved further.

An embodiment of the present disclosure provides a method of fabricating a COA substrate, as shown in FIG. 3, the method comprising the steps of:

101. Forming a black matrix on a substrate.

102. Forming a color filter covering the substrate on the black matrix.

103. Forming an organic insulating film layer covering the color filter on the color filter using an organic insulating material having a relative dielectric constant less than 10.

Specifically, an organic insulating material film can be applied on the whole substrate using the chemical vapor deposition method or the magnetron sputtering method, then forming an organic insulating film layer through exposing, developing and etching. The material of the organic insulating film layer can be acrylic resin or polyamide resin etc.

104. Forming a common electrode layer on the organic insulating film layer.

Specifically, a layer of ITO or IZO having a thickness between 300 Å~500 Å is deposited using the magnetron sputtering method, then the common electrode layer is formed through exposing, developing and etching.

The method of fabricating a COA substrate provided by an embodiment of the present disclosure, by using an organic insulating material having a relative dielectric constant less than 10, forms an organic insulating film layer on the color filter, so that the total film thickness between the data line and the common electrode layer is increased, meanwhile, the relative dielectric constant of the material of the organic insulating film layer is reduced, thus the parasitic capacitance between the data line and the common electrode layer in the finally formed COA substrate is much less than the parasitic capacitance between the data line and the common electrode in the COA substrate in the existing technical solution, which solves the problem of a relatively large parasitic capacitance to be generated between the data line and the common electrode layer because the common electrode layer is formed on the black matrix directly in the existing technical solution, avoids signal delay, and improves the image display quality of the display.

An embodiment of the present disclosure provides a method of fabricating a COA substrate, as shown in FIG. 4, the method comprising the steps of:

201. Forming a gate metal layer comprising a gate, a gate line and a gate line lead on the substrate.

Specifically, a layer of metal film having a thickness between 1000 Å and 7000 Å can be deposited using the magnetron sputtering method on a substrate e.g., a glass substrate or a quartz substrate, the metal film may generally use metals such as molybdenum, aluminum, aluminum nickel alloy, molybdenum tungsten alloy, chromium, or copper etc., and may also use a combined structure of films of the above several materials. Then, a gate metal layer is formed on a certain area of the substrate using a mask plate through patterning processes such as exposing, developing, etching and stripping etc.

202. Forming a gate insulating layer on the gate metal layer.

Specifically, a gate electrode insulating layer film having a thickness of 1000 Å to 6000 Å can be deposited on the glass substrate using the chemical vapor deposition method or the magnetron sputtering method, the material of the gate insulating layer film is generally silicon nitrogen, and can also use silicon oxide and silicon oxynitride etc.

203. Forming an active layer, a source, a drain and a data line on the gate insulating layer.

Specifically, a metal oxide semiconductor film can be deposited on the gate insulating layer using the chemical vapor deposition method, i.e., after the photoresist is applied, the substrate is exposed, developed and etched using the ordinary mask plate to form the active layer.

And then, a layer of metal film having a thickness of 1000 Å to 7000 Å similar as the gate metal is deposited on the substrate using the similar method as fabricating the gate line. The source, the drain and the data line are formed in a certain area through the patterning process.

204. Fabricating a first passivation layer covered with the active layer, the source, the drain and the data line.

Specifically, a first passivation layer having a thickness of 1000 Å to 6000 Å is applied on the whole substrate using the similar method as the gate insulating layer and the active layer, the material thereof is generally silicon nitrogen or a transparent organic resin material.

205. Forming a black matrix on the first passivation layer.

206. Forming a color filter covering the substrate on the black matrix.

207. Forming an organic insulating layer film having a thickness greater than or equal to 1 μm on the color filter using an organic insulating material having a relative dielectric constant less than 5.

208. Forming the organic insulating film layer covering the color filter by processing the organic insulating layer film through patterning process.

209. Forming a common electrode layer on the organic insulating film layer.

Specifically, a layer of ITO or IZO having a thickness between 300 Å~500 Å is deposited using the magnetron sputtering method, then the common electrode layer is formed through exposing, developing and etching.

210. Forming a second passivation layer covering the common electrode layer on the common electrode layer using an organic material having a relative dielectric constant less than 5.

Wherein, the thickness of the second passivation layer is greater than or equal to 1 μm.

Specifically, a passivation layer is applied on the whole substrate by using the similar method as the gate insulating layer and the active layer, the material thereof can be selected based on the pixel size, when the pixel size is relatively large, the material of the second passivation layer is an organic material having a relative dielectric constant less than 5, e.g.: acrylic resin or polyamide resin.

211. Forming a pixel electrode layer on the second passivation layer.

The ITO or IZO is deposited on the second passivation layer using the magnetron sputtering method, then, the pixel electrode layer is formed through exposing, developing and etching.

The method of fabricating a COA substrate provided by an embodiment of the present disclosure, by using an organic insulating material having a relative dielectric constant less than 10, forms an organic insulating film layer on the color filter, so that the total film thickness between the data line and the common electrode layer is increased, meanwhile, the relative dielectric constant of the material of the organic insulating film layer is reduced, thus the parasitic capacitance between the data line and the common electrode layer in the finally formed COA substrate is much less than the parasitic capacitance between the data line and the common electrode in the COA substrate in the existing technical solution, which solves the problem of a relatively large parasitic capacitance to be generated between the data line and the common electrode layer because the common electrode layer is formed on the black matrix directly in the existing technical solution, avoids signal delay, and improves the image display quality of the display. Furthermore, the performance of the COA substrate can be improved, and the display effect of the display screen can be improved further.

An embodiment of the present disclosure provides a display device, the display device comprising a COA substrate provided in the embodiment of the present invention.

The display device provided by an embodiment of the present disclosure, by using an organic insulating material having a relative dielectric constant less than 10, forms an organic insulating film layer on the color filter of the COA substrate of the display device, so that the total film thickness between the data line and the common electrode layer is increased, meanwhile, the relative dielectric constant of the material of the organic insulating film layer is reduced, thus the parasitic capacitance between the data line and the common electrode layer in the finally formed COA substrate is much less than the parasitic capacitance between the data line and the common electrode in the COA substrate in the existing technical solution, which solves the problem of a relatively large parasitic capacitance to be generated between the data line and the common electrode layer because the common electrode layer is formed on the black matrix directly in the existing technical solution, avoids signal delay, and improves the image display quality of the display. Furthermore, the performance of the COA substrate can be improved, and the display effect of the display screen can be improved further.

What are stated above are only embodiments of the present disclosure, however, the protection scope of the present disclosure is not limited to this, any modifications or replacements that can be easily conceived by the skilled person familiar with the present technical field within the technical scope disclosed by the present disclosure should be covered within the protection scope of the present disclosure. Therefore, the protection scope of the present disclosure should depend on the protection scopes of the claims.

The invention claimed is:

1. An array substrate, comprising:
   a plurality of thin film transistors;
   a first passivation layer on the plurality of thin film transistors;
   a black matrix on the first passivation layer;
   a color filter formed over a top surface of the black matrix and exposing at least a portion of the top surface of the black matrix, wherein a top surface of the color filter is higher than the exposed portion of the top surface of the black matrix;
   an organic insulating film layer formed over a top surface of the color filter and the exposed portion of the top surface of the black matrix; and
   a common electrode layer formed over a top surface of the organic insulating film layer,
   wherein
   the top surface of the organic insulating film layer is flat,
   a material of the organic insulating film layer is an organic insulating material having a relative dielectric constant less than 10,
   the color filter further exposes a portion of the black matrix corresponding to a data line, and the common electrode layer is arranged directly above the portion of the black matrix.

2. The array substrate according to claim 1, wherein the color filter on array further comprises: a second passivation layer and a pixel electrode layer, wherein:
   the second passivation layer is arranged on the common electrode layer, and covers a position of the common electrode layer;

the pixel electrode layer is arranged on the second passivation layer;
a material of the second passivation layer is an organic material having a relative dielectric constant less than 5.

3. The array substrate according to claim 2, wherein the thickness of the second passivation layer is greater than or equal to 1μm.

4. The array substrate according to claim 1, wherein the material of the organic insulating film layer is an organic insulating material having a relative dielectric constant less than 5.

5. The array substrate according to claim 1, wherein the thickness of the organic insulating film layer is greater than or equal to 1μm.

6. A display device, wherein the display device comprises an array substrate as claimed in claim 1.

7. The display device according to claim 6, wherein the array substrate further comprises: a second passivation layer and a pixel electrode layer, wherein:
the second passivation layer is arranged on the common electrode layer, and covers a position of the common electrode layer;
the pixel electrode layer is arranged on the second passivation layer;
a material of the second passivation layer is an organic material having a relative dielectric constant less than 5.

8. The display device according to claim 7, wherein the thickness of the second passivation layer is greater than or equal to 1 μm.

9. The display device according to claim 6, wherein the material of the organic insulating film layer is an organic insulating material having a relative dielectric constant less than 5.

10. The display device according to claim 6, wherein the thickness of the organic insulating film layer is greater than or equal to 1 μm.

11. A method of fabricating an array substrate, wherein the method comprises:
forming a plurality of thin film transistors on a top surface of a substrate;
forming a first passivation layer on the plurality of thin film transistors;
forming a black matrix on the first passivation layer;
forming a color filter over a top surface of the black matrix, wherein the color filter exposes at least a portion of the top surface of the black matrix and a top surface of the color filter is higher than the exposed portion of the top surface of the black matrix;
forming an organic insulating film layer over a top surface of the color filter and the exposed portion of the top surface of the black matrix using an organic insulating material having a relative dielectric constant less than 10;
forming a common electrode layer over a top surface of the organic insulating film layer, wherein the top surface of the organic insulating film layer is flat,
wherein the color filter further exposes a portion of the black matrix corresponding to a data line, and the common electrode layer is arranged directly above the portion of the black matrix.

12. The method according to claim 11, wherein the method further comprises:
forming a second passivation layer covering the common electrode layer on the common electrode layer using an organic material having a relative dielectric constant less than 5;
forming a pixel electrode layer on the second passivation layer.

13. The method according to claim 12, wherein the step of forming a second passivation layer covering the common electrode layer on the common electrode layer using an organic material having a relative dielectric constant less than 5 comprises:
forming the second passivation layer having a thickness greater than or equal to 1μm and covering the common electrode layer on the common electrode layer using an organic material having a relative dielectric constant less than 5.

14. The method according to claim 11, wherein the step of forming an organic insulating film layer covering the color filter on the color filter using an organic insulating material having a relative dielectric constant less than 10 comprises:
forming an organic insulating layer film having a thickness greater than or equal to 1 μm on the color filter using an organic insulating material having a relative dielectric constant less than 5;
forming the organic insulating film layer covering the color filter by processing the organic insulating layer film through patterning process.

* * * * *